US008711729B2

(12) United States Patent
Katukam et al.

(10) Patent No.: US 8,711,729 B2
(45) Date of Patent: Apr. 29, 2014

(54) HOST ROUTE CONVERGENCE BASED ON SEQUENCE VALUES

(75) Inventors: Suresh Katukam, San Jose, CA (US); Navindra Yadav, San Jose, CA (US); Venkata Tanikella, San Jose, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/013,176

(22) Filed: Jan. 11, 2008

(65) Prior Publication Data

US 2009/0180383 A1 Jul. 16, 2009

(51) Int. Cl.
*H04L 12/28* (2006.01)

(52) U.S. Cl.
USPC .......................................... 370/254; 370/331

(58) Field of Classification Search
USPC ......... 370/254, 255, 316, 331, 351, 390, 392; 709/205, 221, 227, 238
See application file for complete search history.

(56) References Cited

U.S. PATENT DOCUMENTS

| 7,155,518 | B2* | 12/2006 | Forslow | 709/227 |
|---|---|---|---|---|
| 7,421,693 | B1* | 9/2008 | Joffe et al. | 718/104 |
| 7,552,430 | B2* | 6/2009 | Napier et al. | 717/169 |
| 7,720,008 | B2* | 5/2010 | Aschauer et al. | 370/255 |
| 2002/0057657 | A1* | 5/2002 | La Porta et al. | 370/331 |
| 2003/0193890 | A1* | 10/2003 | Tsillas et al. | 370/216 |
| 2004/0127242 | A1* | 7/2004 | Dashevsky et al. | 455/502 |
| 2006/0080460 | A1* | 4/2006 | Kobayashi et al. | 709/238 |
| 2006/0206634 | A1* | 9/2006 | Torisaki et al. | 710/22 |
| 2006/0209720 | A1* | 9/2006 | Nelson | 370/254 |
| 2006/0209737 | A1* | 9/2006 | Barnhart et al. | 370/316 |
| 2006/0232589 | A1* | 10/2006 | Glein | 345/473 |
| 2006/0291404 | A1* | 12/2006 | Thubert et al. | 370/254 |
| 2007/0008974 | A1* | 1/2007 | Dispensa et al. | 370/392 |
| 2007/0104106 | A1 | 5/2007 | Patel et al. | |
| 2007/0177594 | A1* | 8/2007 | Kompella | 370/390 |
| 2008/0089231 | A1* | 4/2008 | Appanna et al. | 370/235 |
| 2008/0089348 | A1* | 4/2008 | Appanna et al. | 370/401 |
| 2008/0161007 | A1* | 7/2008 | Burgess et al. | 455/450 |
| 2008/0244739 | A1* | 10/2008 | Liu et al. | 726/22 |

* cited by examiner

*Primary Examiner* — Hassan Phillips
*Assistant Examiner* — Ajay Cattungal
(74) *Attorney, Agent, or Firm* — Schwegman Lundberg & Woessner, P.A.

(57) ABSTRACT

In an example embodiment, a method is provided that assigns a sequence value to a host. The host is identified by a host network layer address. After the assignment, the host network layer address and the sequence value are included in an advertisement for transmission. In another example embodiment, another method is provided. Here, a first sequence value associated with the host network layer address is received from a network device. In addition, a second sequence value associated with the same host network layer address is received from a different network device. The first sequence value is ranked relative to the second sequence value and data is transmitted to the network device based on the ranking.

15 Claims, 10 Drawing Sheets

HOST ROUTE CONVERGENCE BASED ON SEQUENCE VALUES

FIELD

The present disclosure relates generally to computer networks. In an example embodiment, the disclosure relates to host route convergence based on sequence values.

BACKGROUND

When a host moves from one network device to another network device, other network devices within a computer network need to update their routing information such that the routes converge on the new location of the host. Such routing information is needed to keep host connections and to minimize loss of network traffic. When a host moves from one network device to another network device, current routing protocols require the old network device (without the host) to transmit a withdraw message and the new network device (with the host) to advertise the new route. The other network devices will transmit data to the new network device only after they have received the withdraw message.

However, the transmission and receipt of withdraw messages can take time, which delays host route convergence. The network traffic associated with the transmission of withdraw messages can seize a large amount of network bandwidth. Furthermore, the delays associated with waiting for withdraw messages can cause packet loss.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

In an example embodiment, a method is provided that assigns a sequence value to a host. The host is identified by a host network layer address. After the assignment, the host network layer address and the sequence value are included in an advertisement for transmission. In another example embodiment, another method is provided. Here, a first sequence value associated with the host network layer address is received from a network device. In addition, a second sequence value associated with the same host network layer address is received from a different network device. The first sequence value is ranked relative to the second sequence value and data is transmitted to one network device or the other network device based on the ranking.

Example Embodiments

Figure 1:
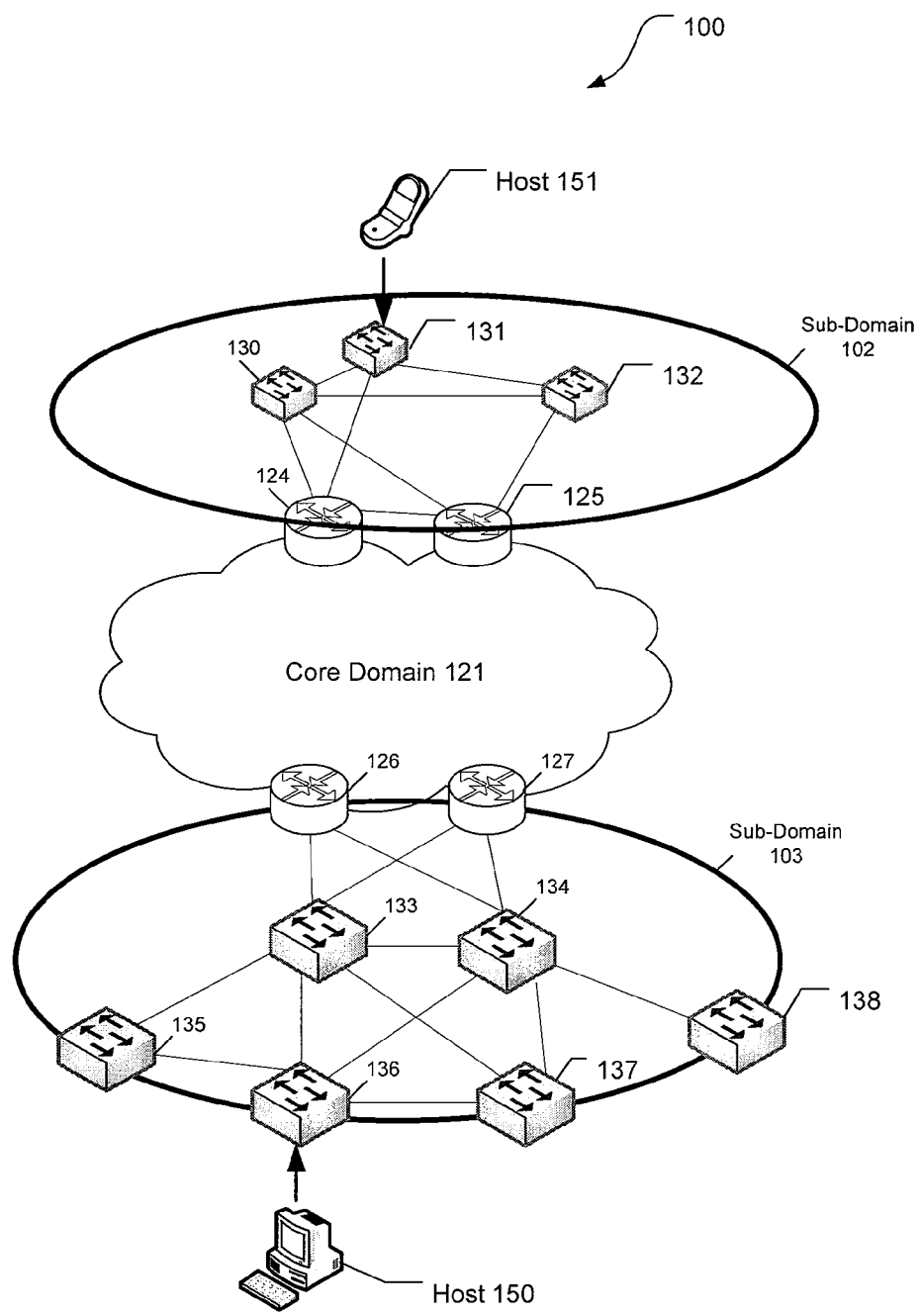
FIG. 1 is a diagram of a networked system, in accordance with an example embodiment.

FIG. 1 is a diagram of a networked system, in accordance with an example embodiment. Generally, computer network 100 is a geographically distributed collection of nodes interconnected by communication links and segments for transporting data between end nodes, such as personal computers and workstations. Computer network 100 may be further interconnected by one or more intermediate network nodes, such as switches 130-138 and routers 124-127. Examples of computer networks, such as computer network 100, include local area networks and wide area networks. A local area network connects the nodes over dedicated private communications links located in the same general physical location, such as a building or campus. A wide area network, on the other hand, connects geographically dispersed nodes over long-distance communications links, such as common carrier telephone lines, optical lightpaths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

One or more nodes may be in communication with a host, such as hosts 150 or 151. Hosts 150 and 151 are devices or program applications that can provide services to other devices or programs. As shown in FIG. 1, computer network 100 includes hosts 150 and 151 in communication with switches 136 and 131, respectively. Examples of hosts 150 and 151 include, for example, computers, Voice-over-IP (VoIP) telephone, mobile telephone 28, servers, and other hosts.

It should be appreciated that groups of computer networks may be maintained as routing domains. A domain is a collection of nodes (e.g., switches and/or routers) under the control of one or more entities that present a common routing policy.

Core domain 121 (or backbone domain) is an example of a domain. To improve routing scalability, a service provider (e.g., an Internet service provider) may divide a domain into multiple sub-domains 102 and 103. It should be noted that a number of nodes, routers, links, etc. may be used in computer network 100, and that the computer network of FIG. 1 shown herein is for simplicity. Further, computer network 100 is described in relation to multiple domains and sub-domains, and the computer network may apply to a variety of other intra-domain network configurations, such as inter-AS, intra-area, intra-level, and other network configurations.

Figure 2:
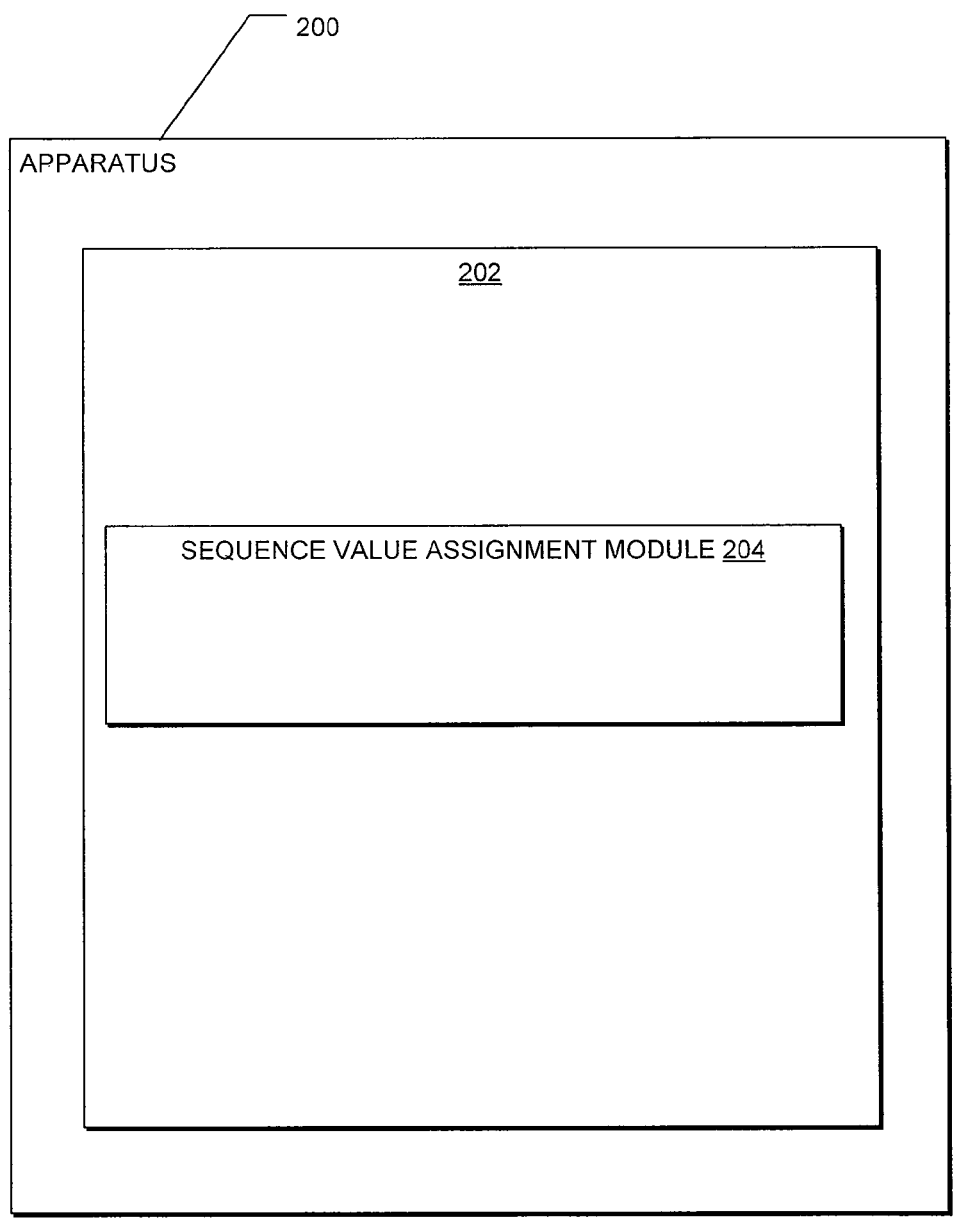
FIG. 2 is a simplified block diagram of a module included in an apparatus, in accordance with an example embodiment.

FIG. 2 is a simplified block diagram of a module included in an apparatus, in accordance with an example embodiment. Apparatus 200 includes operating system 202 (e.g., an Internetworking Operating System) that manages the software processes and/or services executing on the apparatus. As shown in FIG. 2, these software processes and/or services may include sequence value assignment module 204. It should be appreciated that apparatus 200 may be deployed in the form of a variety of network devices that receive data for communication to other network devices, such as switches, routers or the like. For example, apparatus 200 may form a part of one of the switches depicted in FIG. 1. Returning to FIG. 2, in various example embodiments, apparatus 200 may be used to implement computer programs, logic, applications, methods, processes, or other software to assign sequence values to hosts and to converge on a host (or host route convergence) based on sequence value rankings, as described in more detail below.

In brief, sequence value assignment module 204 can assign a sequence value to a host. As explained in more detail below, the sequence value, a network layer address associated with the host (or host network layer address), and a network layer address associated with apparatus 200 are included in an advertisement, which is transmitted to other network devices. Sequence value assignment module 204 may also be configured to receive various advertisements from other network devices and to extract sequence values from the advertisements. As described in more detail below, sequence value assignment module 204 ranks the sequence values and converges on a particular host based on the ranking.

It should be appreciated that in other example embodiments, apparatus 200 may include fewer or more modules apart from those shown in FIG. 2. For example, sequence value assignment module 204 may be separated into an assignment module that generates and assigns sequence values and a ranking module that ranks received sequence values.

Figure 3:
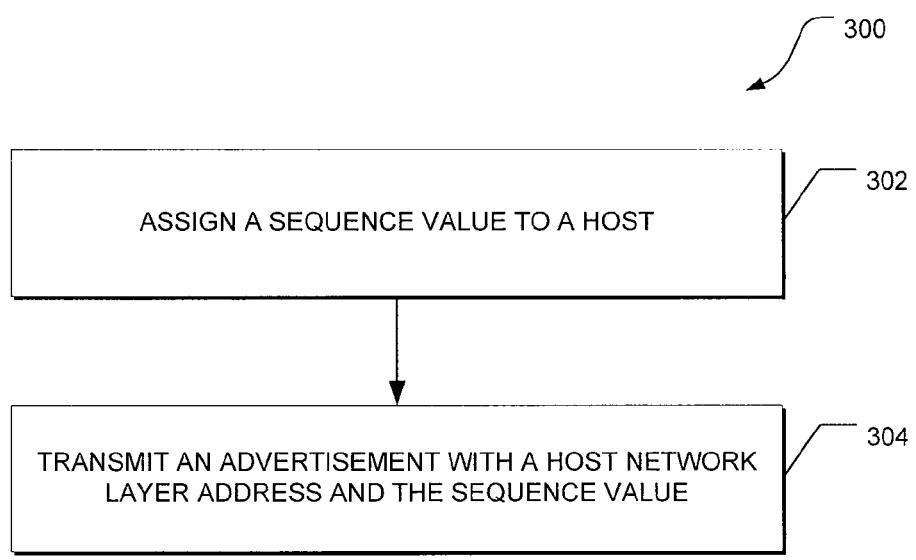
FIG. 3 is a flow diagram of a general overview of a method, in accordance with an example embodiment, for assigning a sequence value to a host.

FIG. 3 is a flow diagram of a general overview of a method, in accordance with an example embodiment, for assigning a sequence value to a host. In an example embodiment, method 300 may be implemented by sequence value assignment module 204 of FIG. 2, employed in an apparatus, such as switch 136 of FIG. 1. As shown in FIG. 3, at 302, a sequence value is assigned to a host. Sequence values are a set of data that have an inherent order. The sequence value may be represented by numbers, letters, or other alphanumeric characters. For example, the sequence value may be a string of numbers, such as "1," "2," "100," "1112.2," or other numbers. Alternatively, the sequence value may be characters, such as "a," "AA," "b," or other characters. As explained in more detail below, the sequence value can be increased or decreased such that the sequence value may form the basis for comparison with other sequence values. It should be noted that, in an example embodiment, the sequence value may be assigned to a host when this host is associated with a network device. For example, a switch can assign a sequence value upon the detection of a new host.

A host and a network device can be identified by a network layer address. In general, a network layer address is an address used by network devices to identify and communicate with each other on a computer network. An example of a network layer address is the Internet Protocol (IP) address. Route information is exchanged between network devices in advertisements to facilitate the routing of network traffic. In general, a route is a unit of information that pairs a destination with the attributes of a path to that destination. An example of an advertisement is an UPDATE message. It should be noted that network layer addresses and sequence values may be included in a variety of different forms of advertisements. For example, a single message may include a single advertisement. Alternatively, a single message may include multiple advertisements that include multiple network layer addresses and associated sequence values. In another example, a single advertisement may be separated into several portions and portions of the advertisement may span across multiple messages.

After the sequence value is assigned, the network device transmits an advertisement at 304 into a computer network to notify other network devices that the host is associated with this particular network device. Such an advertisement may include a host network layer address, sequence value assigned to the host (or associated with the host network layer address), and a network layer address that identifies the network device that transmitted the advertisement.

Figure 4:
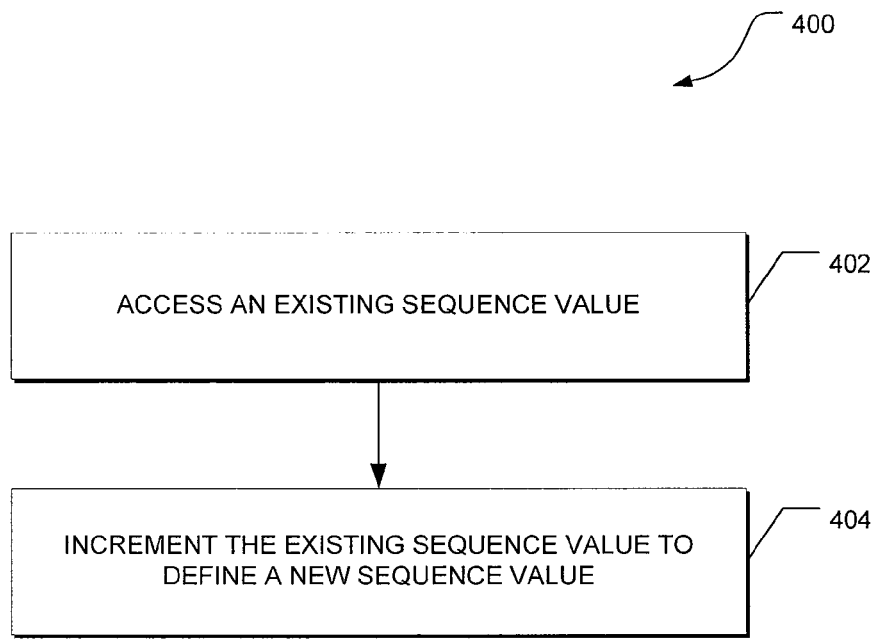
FIG. 4 is a flow diagram of detailed operations, in accordance with an example embodiment, for generating a sequence value.

FIG. 4 is a flow diagram of detailed operations, in accordance with an example embodiment, for generating a sequence value. In an example embodiment, method 400 may be implemented by sequence value assignment module 204 of FIG. 2, employed in an apparatus, such as switch 136 of FIG. 1. Before a sequence value is assigned, the network device may generate the sequence value for assignment to a host. As shown in FIG. 4, in an example embodiment, a new sequence value may be generated by accessing an existing sequence value at 402. The existing sequence value may be a previously received sequence value from another network device received by way of an advertisement. To define a new sequence value, the existing sequence value is incremented at 404. For example, a new sequence value can be generated by adding 1 to an existing sequence value of 60 to define a new sequence value of 61. Similarly, a new sequence value can be generated by incrementing the letter A to a next, sequential letter B. The existing sequence value may be incremented by a variety of values and offsets. It should be noted that in addition to incrementing an existing sequence value, the new sequence value can also be generated by decreasing the existing sequence value. For example, a new sequence value can be generated by subtracting 1 from an existing value of −1 to define a new sequence value of −2.

In another example embodiment, the generation of the new sequence value may be based on time. Here, the new sequence value can be derived from a system clock. All the network devices within a computer network are synchronized to the system clock. The new sequence value can be the time (e.g., hour, minutes, seconds, milliseconds, and other time) from the system clock or a value derived from the system clock.

Figure 5:
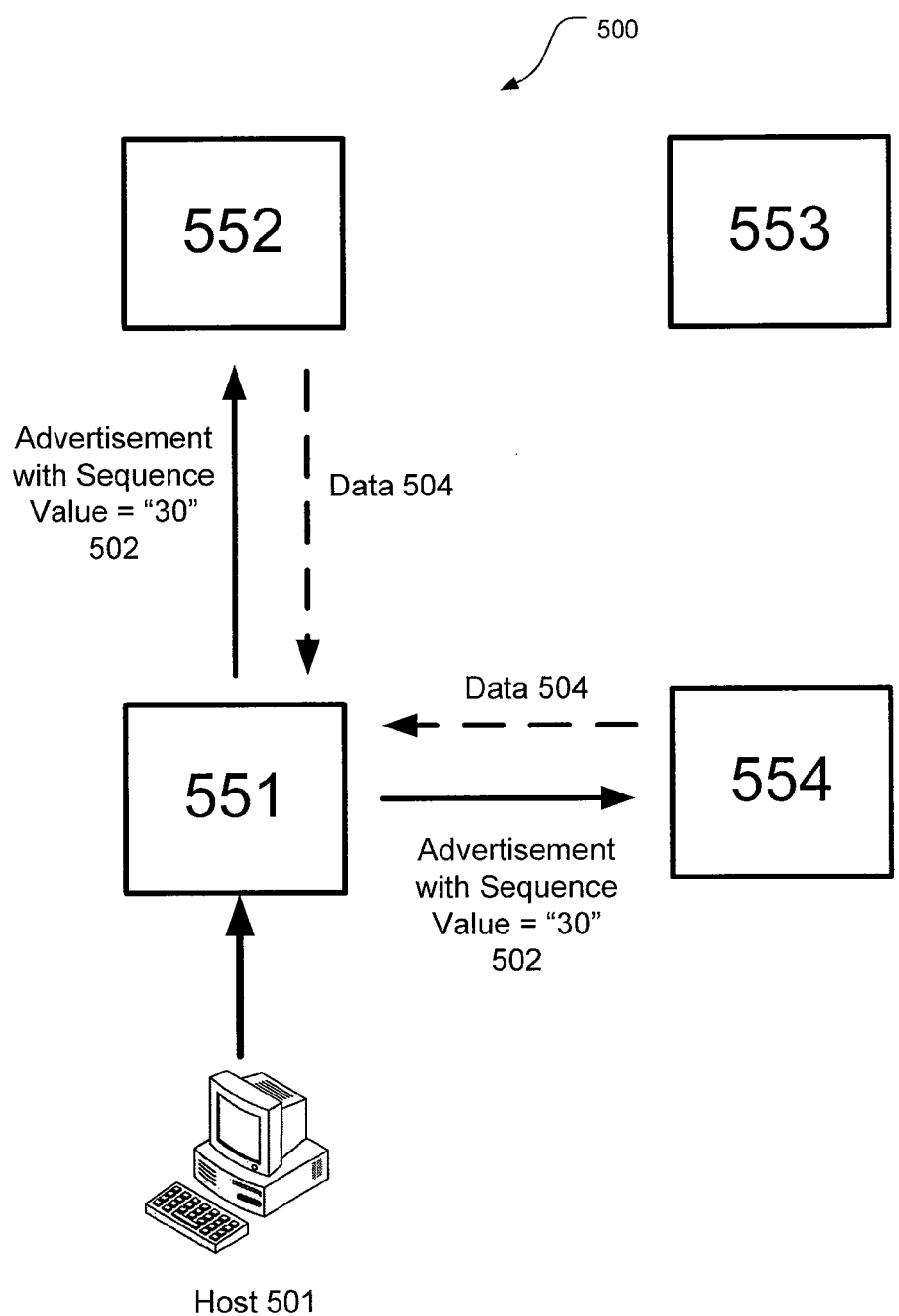
FIG. 5 is a simplified diagram of a computer network, in accordance with an example embodiment, illustrating the assignment of a sequence value to a host and the advertisement of the sequence value.

FIG. 5 is a simplified diagram of a computer network, in accordance with an example embodiment, illustrating the assignment of a sequence value to a host and the advertisement of the sequence value. Computer network 500 includes switches 551-554, which may belong to one or more sub-domains. As shown in FIG. 5, host 50 is associated with switch 551. Upon detection of host 501, switch 551 assigns a sequence value of "30" to host 501 (or to host network layer address). A system clock is provided in computer network 500 and switches 551-554 are synchronized to the system clock. In this example embodiment, the sequence value is based on time and the sequence value "30" may be the minutes derived from the system clock.

After the sequence value is assigned, switch 551 transmits advertisement 502 to routers 552 and 554 of the association with host 501. Advertisement 502 includes the IP address of host 501, the sequence value "30" associated with the host, and an IP address of switch 551. As a result of receiving advertisement 502, switches 552 and 554 transmit data 504 to host 501. It should be appreciated that, depending on the network configuration and network protocol used, advertisement 502 may be transmitted to a variety of network devices and transmitted by a variety of different methods. For example, advertisement 502 may be transmitted to all routers within a sub-domain using multicast broadcast where the advertisement is transmitted as native packets. In still another example, advertisement 502 is transmitted only to a home anchor router using unicast broadcast where the advertisement 502 is tunneled between home anchor border routers and foreign sub-domain border routers. Here, advertisement 502 is tunneled between sub-domain border routers and foreign sub-domain border routers.

Figure 6:
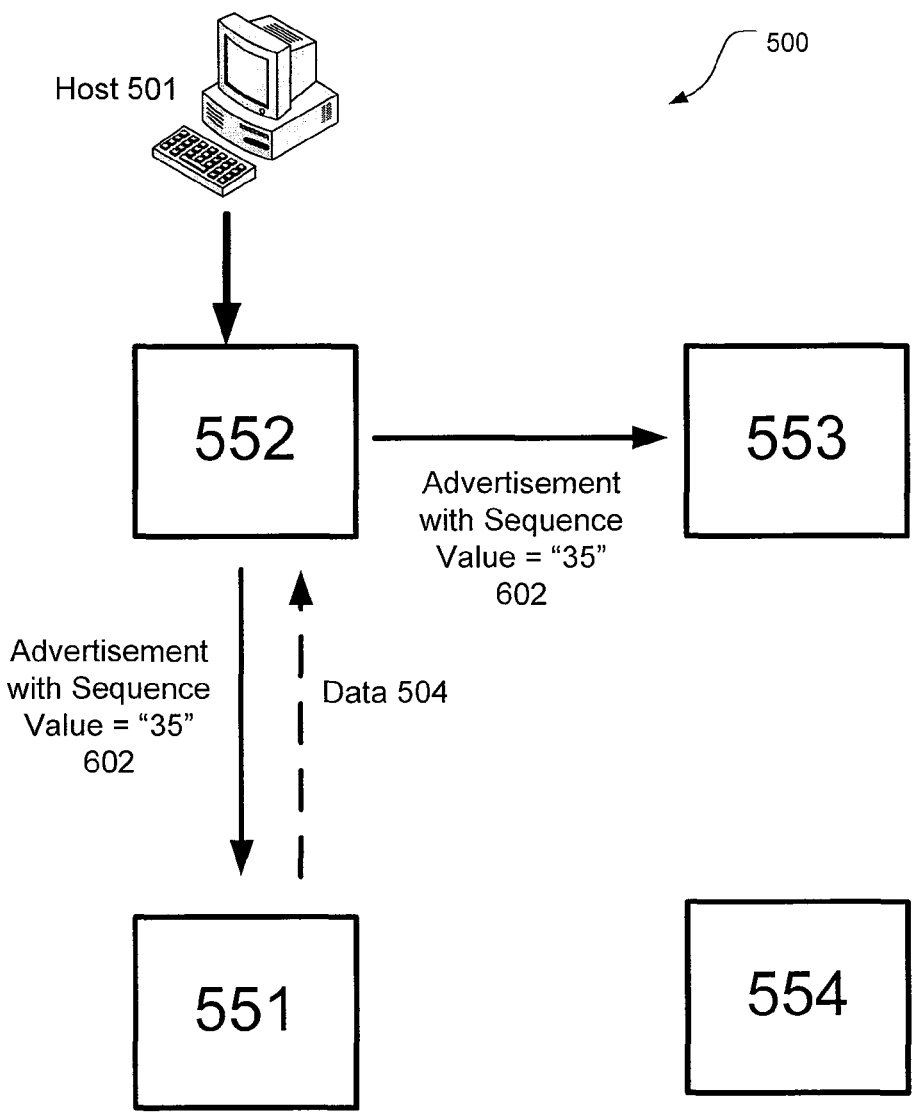
FIG. 6 is a simplified diagram of a computer network, in accordance with an example embodiment, illustrating the assignment of a sequence value to a host after the host has moved.

FIG. 6 is a simplified diagram of a computer network, in accordance with an example embodiment, illustrating the assignment of a sequence value to a host after the host has moved. Computer network 500 of FIG. 6 includes switches 551-554. As described previously in FIG. 5, host 501 was initially associated with switch 551. However, as shown in FIG. 6, host 501 moved and the host is now associated with switch 552. Upon detection of host 501, switch 552 assigns a sequence value of "35" to host 501 (or to host network layer address). Here, switches 551-554 are synchronized with a system clock. Like switch 551, switch 552 generates the sequence value based on time. The sequence value "35" may be the minutes derived from the system clock.

After the sequence value of "35" is assigned, switch 552 transmits advertisement 602 to switches 551 and 553 of the association with host 501. Here, advertisement 602 includes the IP address of host 501, the sequence value "35" associated with the host, and the IP address of switch 552 that transmitted the advertisement. As a result of receiving advertisement 602, switch 551 transmits data 504 to host 501. However, as explained below, depending on the sequence values received, switch 553 may or may not transmit data to host 501 that is in communication with switch 552.

Figure 7:
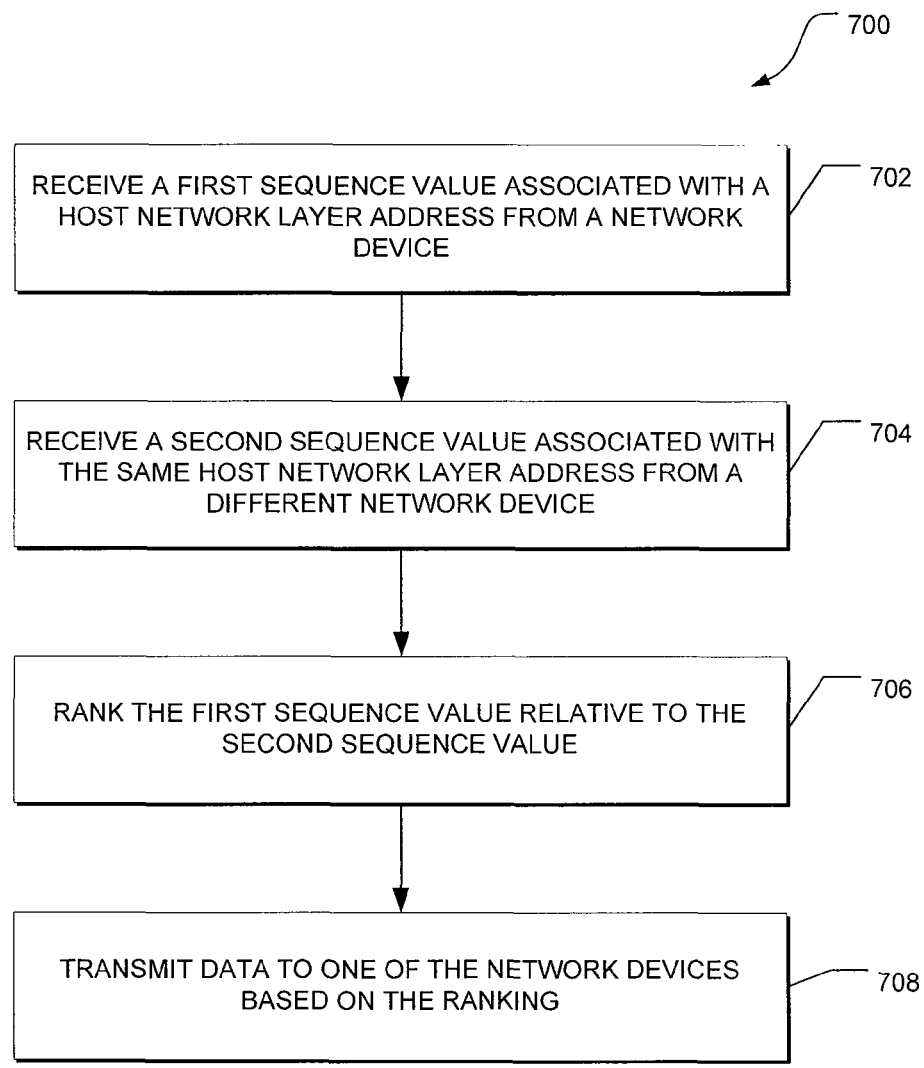
FIG. 7 is a flow diagram of a general overview of a method, in accordance with an example embodiment, for host route convergence based on rankings.

FIG. 7 is a flow diagram of a general overview of a method, in accordance with an example embodiment, for host route convergence based on rankings. In an example embodiment, method 700 may be implemented by sequence value assignment module 204 of FIG. 2, employed in an apparatus, such as switch 136 of FIG. 1. A network device may receive multiple advertisements. For example, as shown in FIG. 7, a first advertisement is received at 702 from a network device. This first advertisement may include a host network layer address, a first sequence value associated with the host network layer address, and a network layer address of the network device. At 704, a second advertisement is received from a different network device. This second advertisement includes the same host network layer address, a second sequence value associated with the host network layer address, and a network layer address of this different network device.

With the first and second sequence values, the first sequence value is ranked relative to the second sequence value at 706. In an example embodiment, the first and second sequence values may be ranked by comparing the first and second sequence values. After the ranking, routes are converged onto one or more hosts based on the ranking. For example, as explained in more detail below, data is transmitted to one of the network devices at 708 based on the ranking.

Figure 8:
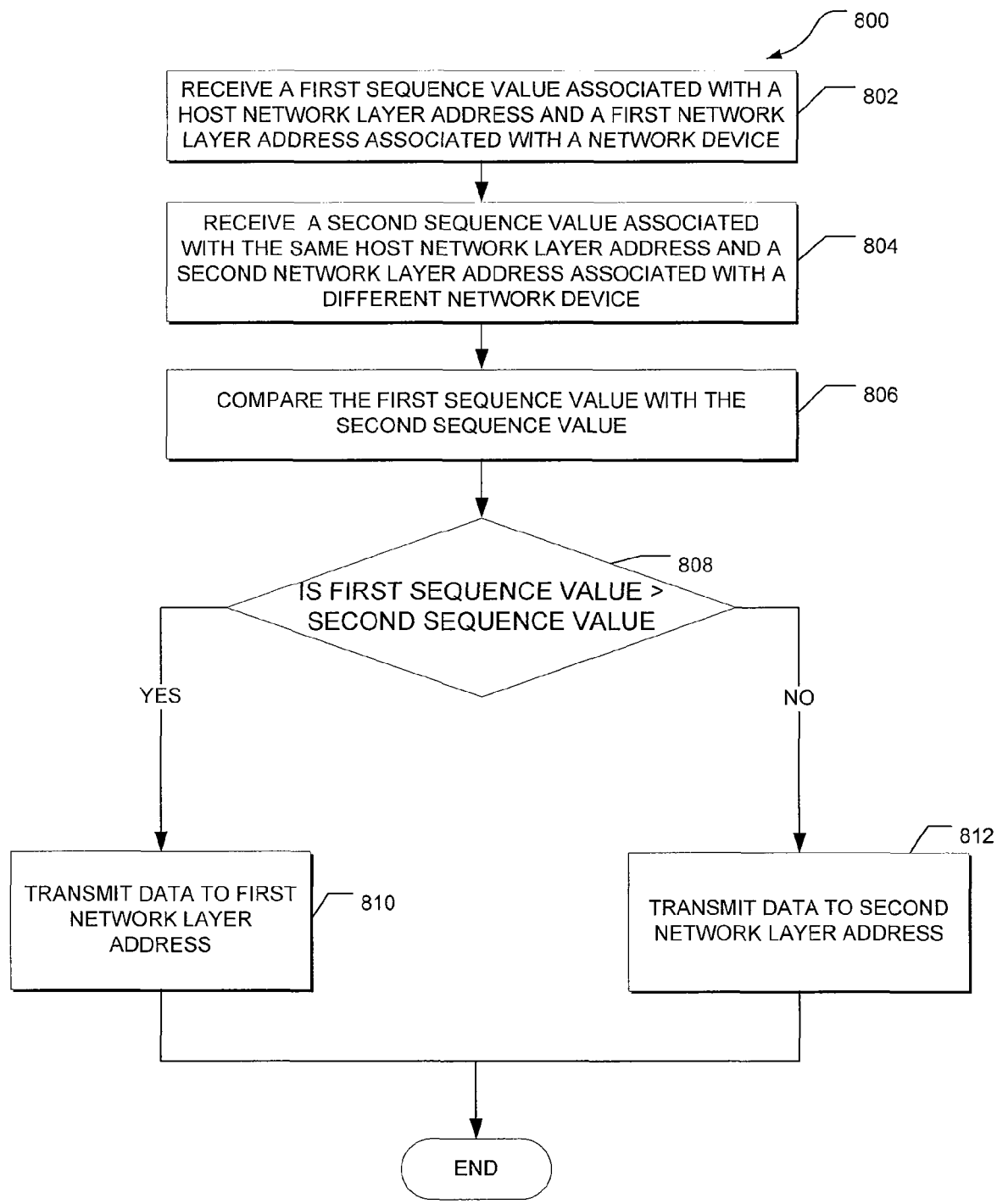
FIG. 8 is a flow diagram of more detailed operations, in accordance with an example embodiment, for host route convergence based on rankings.

FIG. 8 is a flow diagram of more detailed operations, in accordance with an example embodiment, for host route convergence based on rankings. In an example embodiment, method 800 may be implemented by sequence value assignment module 204 of FIG. 2, employed in an apparatus, such as switch 136 of FIG. 1. As shown in FIG. 8, a host network layer address, a first sequence value associated with the host network layer address, and a first network layer address associated with a network device are received in a first advertisement at 802. At 804, the same host network layer address, a second sequence value associated with the same host network layer address, and a second network layer address associated with a different network device are received in a second advertisement. The first sequence value is then ranked relative to the second sequence value. In an example embodiment, as shown at 806, the first and second sequence values may be ranked by comparing the first sequence value with the second sequence value.

In an example embodiment, the advertisement with a lower sequence value ranking is rejected. Instead, routes converge on the host with the higher sequence value ranking. For example, a determination is made at 808 as to whether the first sequence value is greater than the second sequence value. A sequence value of "324," for instance, is ranked higher than a sequence value of "322." In another example, a sequence value of "AA" is ranked higher than "A." In still another example, a sequence value of "−1" is ranked higher than a sequence value of "−10."

If the first sequence value is greater than the second sequence value, then routes to the host converge based on the first advertisement with the first sequence value. Here, for example, one or more paths are computed to the network device that is located at the first network layer address. Thereafter, data for the host is transmitted to the first network layer address associated with the network device at 810 because the first sequence value is ranked higher than the second sequence value. On the other hand, if first sequence value is less than second sequence value, then the routes to the host converge based on the second advertisement with the second sequence value. Here, for example, one or more paths are computed to the other network device that is located at the second network layer address. In this example, data for the host then is transmitted to the second network layer address associated with the other network device at 812.

It should be noted that routes may also converge on the host with the lower ranked sequence value. In this other embodiment, the first sequence value is compared with the second sequence value. If the first sequence value is less than or ranked lower than the second sequence value, then data is transmitted to the first network layer address. On the other hand, if the first sequence value is greater than the second sequence value, then data is transmitted to the second network layer address.

Figure 9:
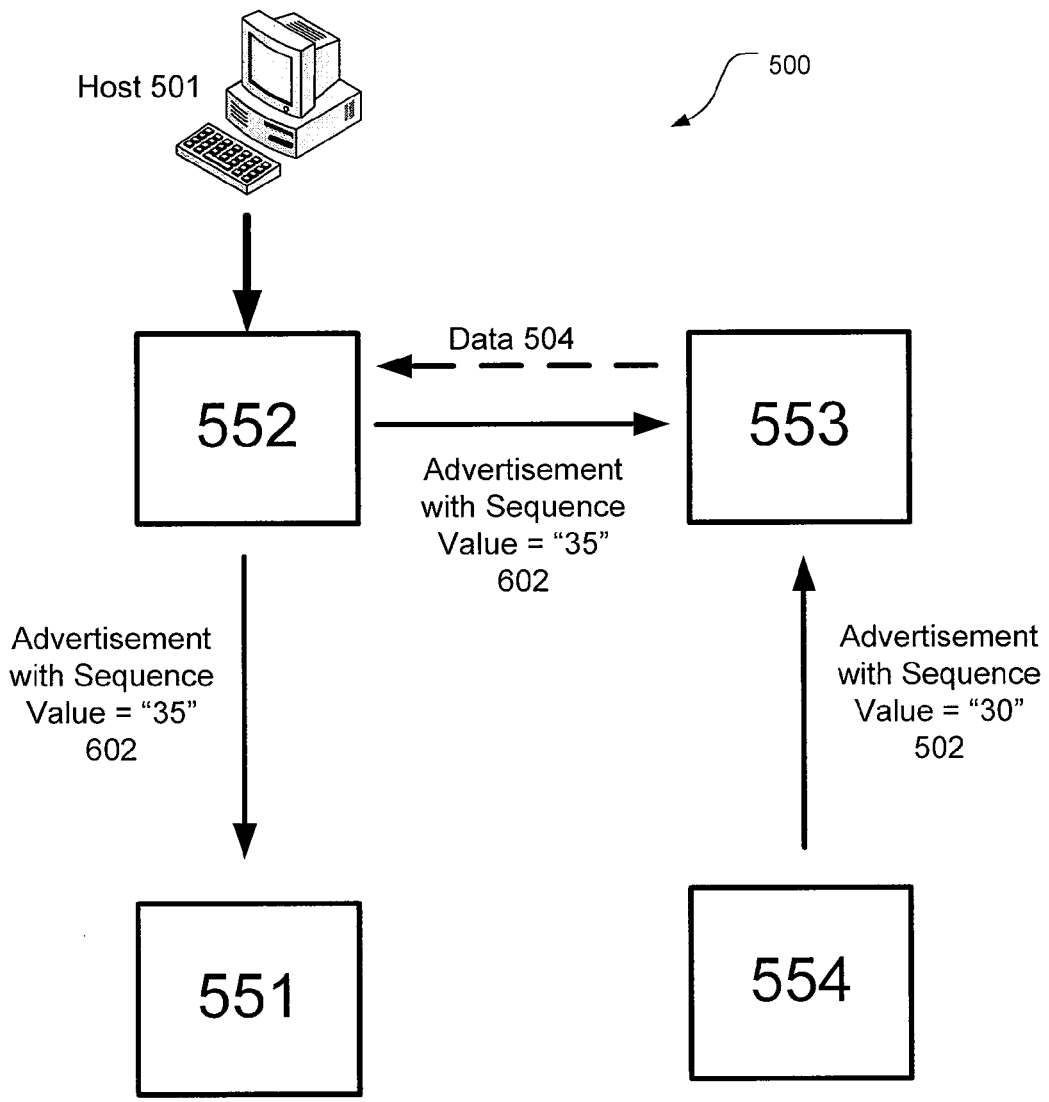
FIG. 9 is a simplified diagram of a computer network, in accordance with an example embodiment, illustrating host route convergence.

FIG. 9 is a simplified diagram of a computer network, in accordance with an example embodiment, illustrating host route convergence. Computer network 500 includes switches 551-554, which may belong to one or more sub-domains. As discussed above in FIGS. 5 and 6, host 501 moved from switch 551 to switch 552. When host 501 is initially associated with switch 551, the host transmitted advertisement 502 with sequence value "30" to switch 554. However, host 501 moved and, as shown in FIG. 9, is now associated with switch 552. Upon detection of host 501, switch 552 assigns a sequence value of "35" to host 501 (or to host network layer address) and the switch transmits advertisement 602 with sequence value "35" to switches 551 and 553.

Switch 553 receives advertisement 602 with sequence value "35" associated with host network layer address. However, switch 553 also receives advertisement 502 with sequence value "30" associated with the same host network layer address. Switch 551 did not originally transmit advertisement 502 directly to switch 553. Instead, switch 554, which received advertisement 502, relays or forwards the advertisement to switch 553. This relay results in a delay of transmission of advertisement 502 to switch 553, and therefore switch 553 receives both advertisements 502 and 602 at about the same time.

In this example embodiment, computer network 500 is configured to converge on a host, such as host 501, with the highest ranked sequence value. Switch 553 therefore is configured to rank the sequence value "35" associated with advertisement 602 relative to sequence value "30" associated with advertisement 502. In an example embodiment, switch 553 compares sequence value "35" with sequence value "30." Sequence value "35" is greater or ranked higher than sequence value "30." As a result, routes in computer network 500 converge on host 501 associated with switch 552 instead of switch 551. Switch 553 therefore transmits data 504 to switch 552 associated with host 501 and not to switch 551. The use of sequence values may therefore result in fast host route convergence because computer network 500 does not have to wait for withdraw of the route from a disassociated network device, such as switch 551.

Figure 10:
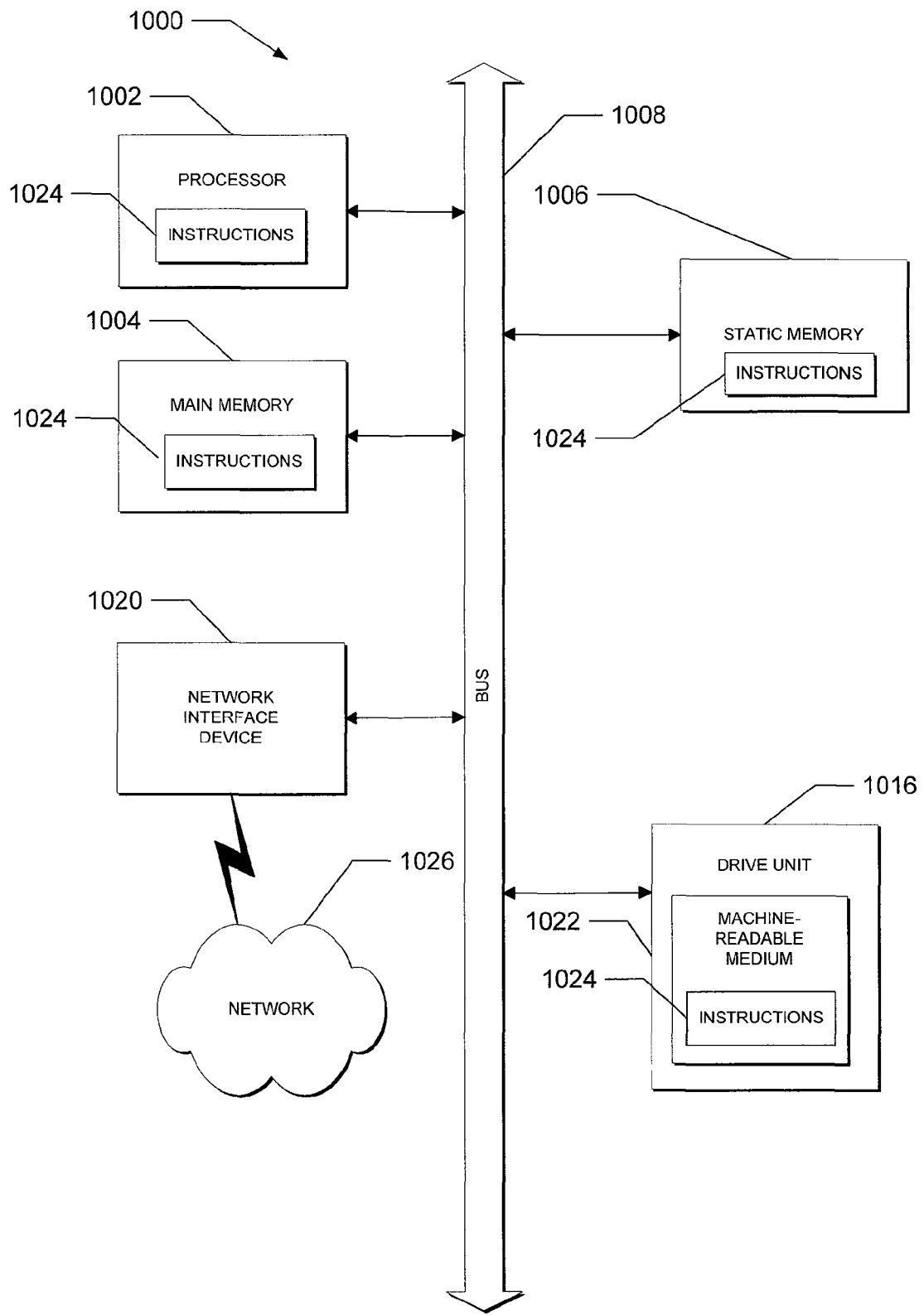
FIG. 10 is a simplified block diagram of a machine in the example form of a computing system within which a set of instructions, for causing the machine to perform any one or more of the methodologies discussed herein, may be executed.

FIG. 10 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1000 includes processor 1002 (e.g., a central processing unit (CPU)), main memory 1004 and static memory 1006, which communicate with each other via bus 1008. Computing system 1000 may also include disk drive unit 1016 and network interface device 1020.

Disk drive unit 1016 includes machine-readable medium 1022 on which is stored one or more sets of instructions and data structures (e.g., software 1024) embodying or utilized by any one or more of the methodologies or functions described herein. Software 1024 may also reside, completely or at least partially, within main memory 1004 and/or within processor 1002 during execution thereof by computing system 1000, with main memory 1004 and processor 1002 also constituting machine-readable, tangible media. Software 1024 may further be transmitted or received over network 1026 via network interface device 1020 utilizing any one of a number of well-known transfer protocols (e.g., Hypertext Transfer Protocol (HTTP)).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, from a first network device, a first sequence value associated with a host network layer address corresponding to a host device;
receiving, from a second network device, a second sequence value associated with the host network layer address;
ranking the first sequence value relative to the second sequence value, the ranking comprising comparing the first sequence value with the second sequence value;
determining that the host device is currently associated with the first network device and that the host device is currently not associated with the second network device, based on the ranking; and
transmitting data to the first network device currently associated with the host device.

2. The method of claim 1, wherein the data is transmitted to the first network device when the first sequence value is ranked higher than the second sequence value.

3. The method of claim 1, wherein the data is transmitted to the first network device when the first sequence value is ranked lower than the second sequence value.

4. The method of claim 1, wherein the first and second sequence values are based on time.

5. The method of claim 1, wherein at least one of the first network device and the second network device is a network switch.

6. An apparatus comprising:
a processor; and a memory in communication with the processor, the memory comprising instructions executable by the processor, when the instructions are executed the processor being operable to:

receive, from a first network device, a first sequence value associated with a host network layer address corresponding to a host device;

receive, from a second network device, a second sequence value associated with the host network layer address;

rank the first sequence value relative to the second sequence value, the ranking comprising comparing the first sequence value with the second sequence value;

determine that the host device is currently associated with the first network device and that the host device is currently not associated with the second network device, based on the ranking; and transmit data to the first network device currently associated with the host device.

7. The apparatus of claim 6, wherein the data is transmitted to the first network device when the first sequence value is ranked higher than the second sequence value.

8. The apparatus of claim 6, wherein the data is transmitted to the first network device when the first sequence value is ranked lower than the second sequence value.

9. The apparatus of claim 6, wherein the first and second sequence values are based on time.

10. The apparatus of claim 6, wherein at least one of the first network device and the second network device is a network switch.

11. A non-transitory machine-readable storage medium comprising instructions that, when executed by one or more processors of a machine, cause the machine to perform operations comprising:

receiving, from a first network device, a first sequence value associated with a host network layer address corresponding to a host device;

receiving, from a second network device, a second sequence value associated with the host network layer address;

ranking the first sequence value relative to the second sequence value, the ranking comprising comparing the first sequence value with the second sequence value;

determining that the host device is currently associated with the first network device and that the host device is currently not associated with the second network device, based on the ranking; and transmitting data to the first network device currently associated with the host device.

12. The storage medium of claim 11, wherein the data is transmitted to the first network device when the first sequence value is ranked higher than the second sequence value.

13. The storage medium of claim 11, wherein the data is transmitted to the first network device when the first sequence value is ranked lower than the second sequence value.

14. The storage medium of claim 11, wherein the first and second sequence values are based on time.

15. The storage medium of claim 11, wherein at least one of the first network device and the second network device is a network switch.

* * * * *